US011365018B2

(12) United States Patent
Sorrentino et al.

(10) Patent No.: US 11,365,018 B2
(45) Date of Patent: Jun. 21, 2022

(54) MACHINE AND METHOD FOR FILLING CARTRIDGES FOR AEROSOL-GENERATING DEVICES

(71) Applicant: G.D S.p.A., Bologna (IT)

(72) Inventors: Catello Sorrentino, Bologna (IT); Gabriele Neva, Bologna (IT); Massimo Cavagni, Bologna (IT); Luca Testoni, Bologna (IT); Luca Lanzarini, Bologna (IT); Luca Federici, Bologna (IT)

(73) Assignee: G.D S.p.A.

( * ) Notice: Subject to any disclaimer, the term of this patent is extended or adjusted under 35 U.S.C. 154(b) by 88 days.

(21) Appl. No.: 16/962,871

(22) PCT Filed: Dec. 19, 2018

(86) PCT No.: PCT/IB2018/060356
§ 371 (c)(1),
(2) Date: Jul. 17, 2020

(87) PCT Pub. No.: WO2019/142040
PCT Pub. Date: Jul. 25, 2019

(65) Prior Publication Data
US 2020/0346791 A1 Nov. 5, 2020

(30) Foreign Application Priority Data
Jan. 19, 2018 (IT) .................. 102018000001387

(51) Int. Cl.
*B65B 3/04* (2006.01)
*B65B 31/00* (2006.01)
(Continued)

(52) U.S. Cl.
CPC ............... *B65B 3/04* (2013.01); *B65B 31/00* (2013.01); *B65B 43/42* (2013.01); *B65B 57/04* (2013.01);
(Continued)

(58) Field of Classification Search
None
See application file for complete search history.

(56) References Cited

U.S. PATENT DOCUMENTS

| | | | |
|---|---|---|---|
| 5,209,044 A * | 5/1993 | D'Addario | ............... B65B 3/04 53/272 |
| 2015/0289565 A1* | 10/2015 | Cadieux | ................. A24F 40/70 131/328 |

(Continued)

FOREIGN PATENT DOCUMENTS

WO 2016083920 A2 6/2016

OTHER PUBLICATIONS

International Search Report dated Mar. 14, 2019. 11 pages.

*Primary Examiner* — Hemant Desai
*Assistant Examiner* — Tanzim Imam
(74) *Attorney, Agent, or Firm* — RMCK Law Group PLC

(57) ABSTRACT

A machine for filling cartridges for aerosol-generating devices includes a feed line, which supplies cartridges to be filled with their corresponding ends facing upwards, a filling station, which receives the cartridges and has at least one dispensing nozzle which is mobile along a path of forward stroke and is pre-arranged for dispensing a product, first inspection means for inspecting the cartridge ends in order to identify, for each one, a position of the corresponding open area; and an orientation station, which receives the cartridges that have been inspected and includes orientation means for rotating each cartridge about its own longitudinal axis based on the corresponding identified position, and bringing the open area into a pre-set reference position for enabling entry of the dispensing nozzle into the open area when the dispensing nozzle is driven along the path of forward stroke.

12 Claims, 5 Drawing Sheets

(51) Int. Cl.
  *B65B 43/42*    (2006.01)
  *B65B 57/04*    (2006.01)
  *B65G 47/244*   (2006.01)
  *B65G 47/86*    (2006.01)

(52) U.S. Cl.
  CPC ......... *B65G 47/244* (2013.01); *B65G 47/847* (2013.01); *B65G 2201/0226* (2013.01); *B65G 2203/0225* (2013.01); *B65G 2203/04* (2013.01)

(56) References Cited

U.S. PATENT DOCUMENTS

2015/0375943 A1* 12/2015 Ellefson ................ B65G 49/00
                                                      101/40.1
2017/0343483 A1* 11/2017 Piana .................... B65G 54/02
2018/0170596 A1*  6/2018 Marcantoni ............... B67B 3/26

* cited by examiner

MACHINE AND METHOD FOR FILLING CARTRIDGES FOR AEROSOL-GENERATING DEVICES

CROSS-REFERENCE TO RELATED APPLICATIONS

This application is a 371 National Stage of International Application No. PCT/IB2018/060356, filed Dec. 19, 2018, which claims priority to Italian Patent Application No. 102018000001387 filed Jan. 19, 2018. The disclosure of each of the above applications is incorporated herein by reference in its entirety.

The present invention falls in the technical sector of aerosol-generating devices. In particular, the invention regards a machine for filling cartridges for aerosol-generating devices and a method for filling cartridges for aerosol-generating devices.

By "aerosol-generating devices" are meant those devices for personal use that deliver a gas in which liquid or solid particles are suspended. Such aerosol-generating devices have been widely used for years in the pharmaceutical industry (for example, as inhalers for medicaments), and moreover, more recently, in the tobacco industry (in particular, for electronic cigarettes).

Aerosol-generating devices comprise a cartridge (i.e., a small container or a vial) filled with a product to be delivered. According to the specific case, the cartridge may comprise also other elements, such as an absorbent substrate (if the cartridge is filled with a liquid product), or a channel for passage of air, or, in the specific case of electronic cigarettes, a wick with a resistance, or other elements still.

The cartridge usually has a prevalently longitudinal development and may have, for example, a circular, oval, or rectangular cross section. For the purposes of filling, the cartridge comprises, at a corresponding end, one or more openings set symmetrically or asymmetrically with respect to the axis of the cartridge itself.

For production of the above aerosol-generating devices, the cartridges are filled with the product to be delivered by means of automatic machines.

A machine for filling cartridges for aerosol-generating devices of a known type comprises: a feed line, along which the empty cartridges are supplied in a direction of feed; a filling station, which is located downstream of the feed line and receives the empty cartridges from the feed line to fill them with a product; and an output line, which receives the cartridges that have been filled in the filling station and conveys them in an output direction.

In particular, the filling station comprises a plurality of dispensing nozzles (each constituted, for example, by a needle). Each nozzle is mobile so as to enter partially into the opening of a cartridge, performing a vertical movement from above downwards, in order to dispense the product into it; then, once the cartridge is filled, each nozzle moves back upwards into the initial position.

The solution of a known type described above presents, however, some drawbacks.

In fact, it may happen that entry of the dispensing nozzle into the cartridge is hindered by one of the components that may be present in the cartridge (for example, as has already been said, an absorbent substrate, a channel for passage of air, a wick with a resistance, etc.). In other words, even though the cartridge has an opening symmetrical with respect to its own axis, the position of which is hence pre-determined, this may in any case be partially occluded by the aforesaid components. Consequently, it frequently happens that the dispensing nozzle, while it is entering the cartridge, contacts one of the components in the cartridge: in this situation, the filling operation is not successful, and the cartridge must be rejected. This entails significant costs and moreover reduces the throughput of the machine. In addition, there is a waste of the product, which, since it does not enter the cartridge, is dispensed outside, thus dirtying the filling station, which, instead, should be as clean as possible.

The same drawback arises if the opening of the cartridge is set asymmetrically with respect to the longitudinal axis thereof, and/or has an irregular profile and/or if one or more openings of small dimensions are present (even in the absence of other components inside the cartridge). In this case, in fact, it may happen that, in the filling station, the dispensing nozzle is not perfectly aligned with the opening of the cartridge, and that, as a result, as it moves from above downwards, instead of entering the cartridge through the opening, it knocks against a wall of the cartridge.

Added to what has been said is the fact that the dispensing nozzle (which is of small dimensions) may suffer damage following upon undesirable contact with one of the components in the cartridge or with a wall (or else, an occluded area) of the cartridge and must, consequently, be frequently replaced. This entails, in addition to the related costs, also times of stoppage of the machine that are not negligible.

The object of the present invention is to overcome the aforesaid problems. This object is achieved by a machine for filling cartridges for aerosol-generating devices and a method for filling cartridges for aerosol-generating devices according to the annexed claims.

Advantageously, thanks to the present invention entry of the dispensing nozzle and correct dispensing of the product into the cartridge are guaranteed; i.e., contact is prevented between the dispensing nozzle and an occluded or partially occluded area of the cartridge (any components that may be present in the cartridge or a wall of the cartridge itself).

Consequently, the costs due to rejects as a result of failure to fill the cartridges and moreover those that can be put down to damage to the dispensing nozzle referred to above are eliminated.

Moreover, thanks to the present invention, the total throughput of the machine according to the prior art is optimised in so far as no waste of cartridges occurs, nor is it necessary to stop the machine for replacement of the nozzles, such drawbacks being present, instead, in the prior art.

Again, any waste of the dispensed product is prevented, and a greater cleanliness of the filling area as compared to known solutions is guaranteed.

Further advantages will become more evident from the ensuing treatment, with the aid of the attached plates of drawings, wherein.

Figure 1:
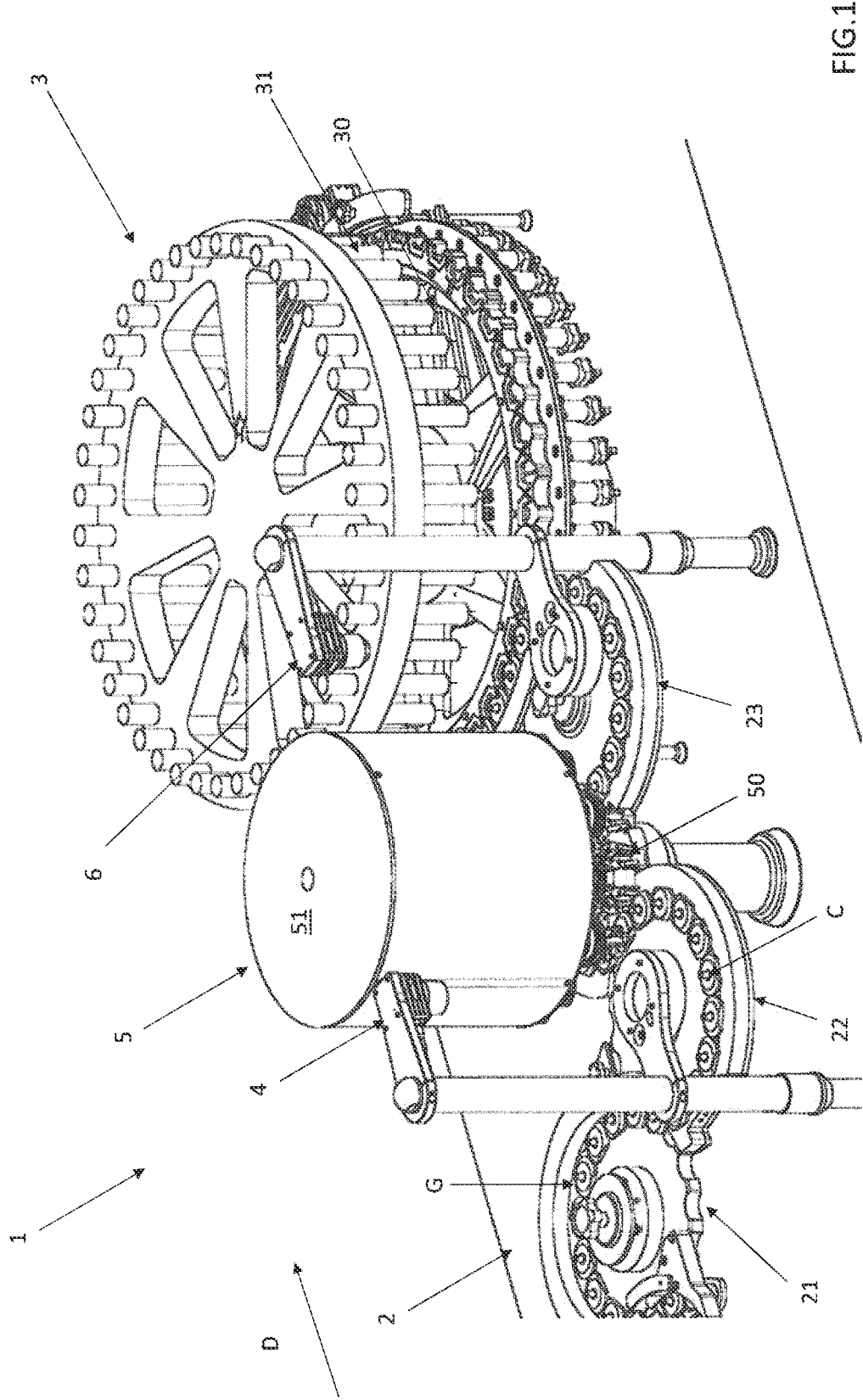
FIG. 1 is a perspective view of a machine for filling cartridges for aerosol-generating devices according to the invention.
Figure 2:
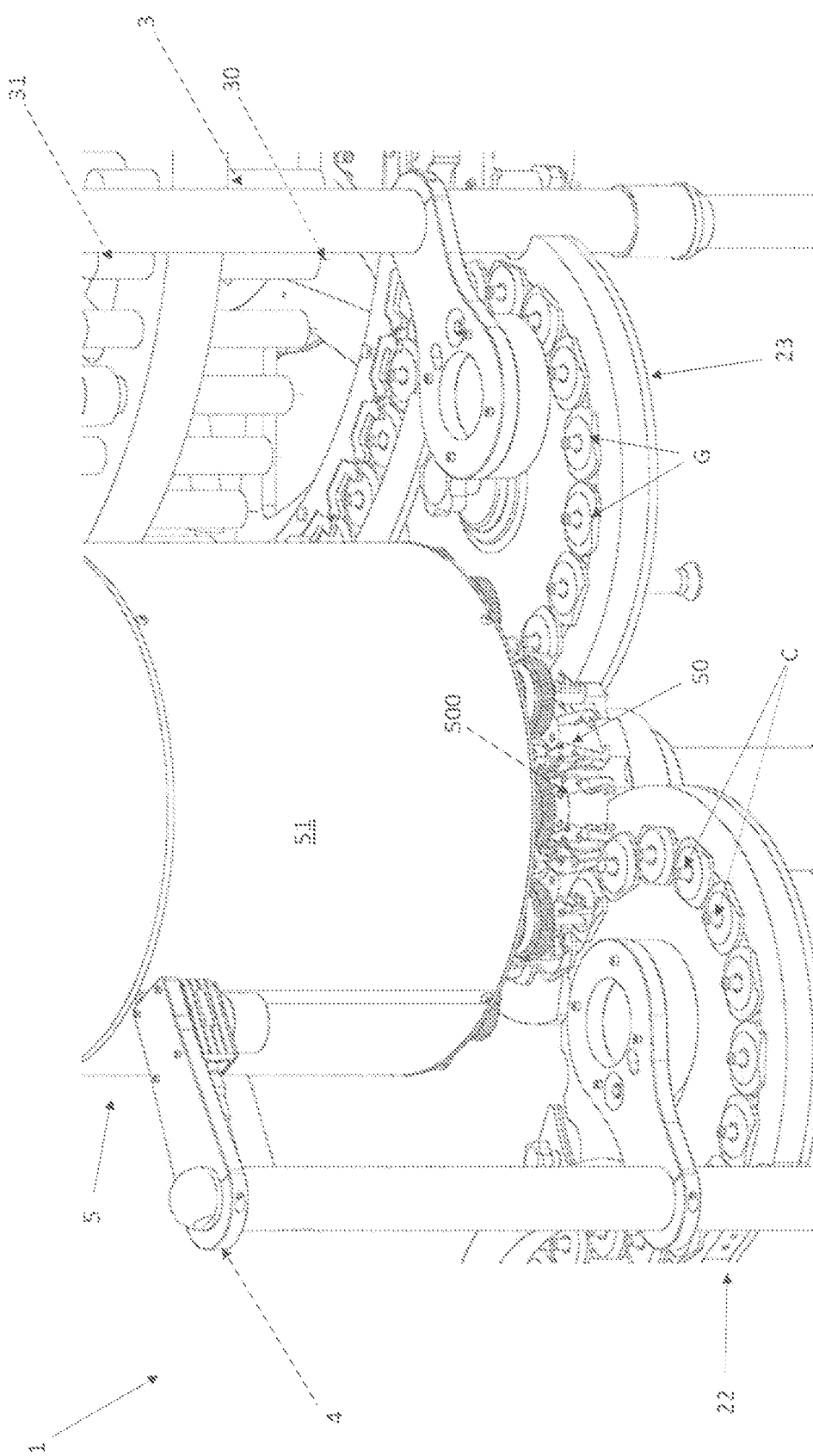
FIG. 2 is a partial enlarged view of FIG. 1.
Figure 3:
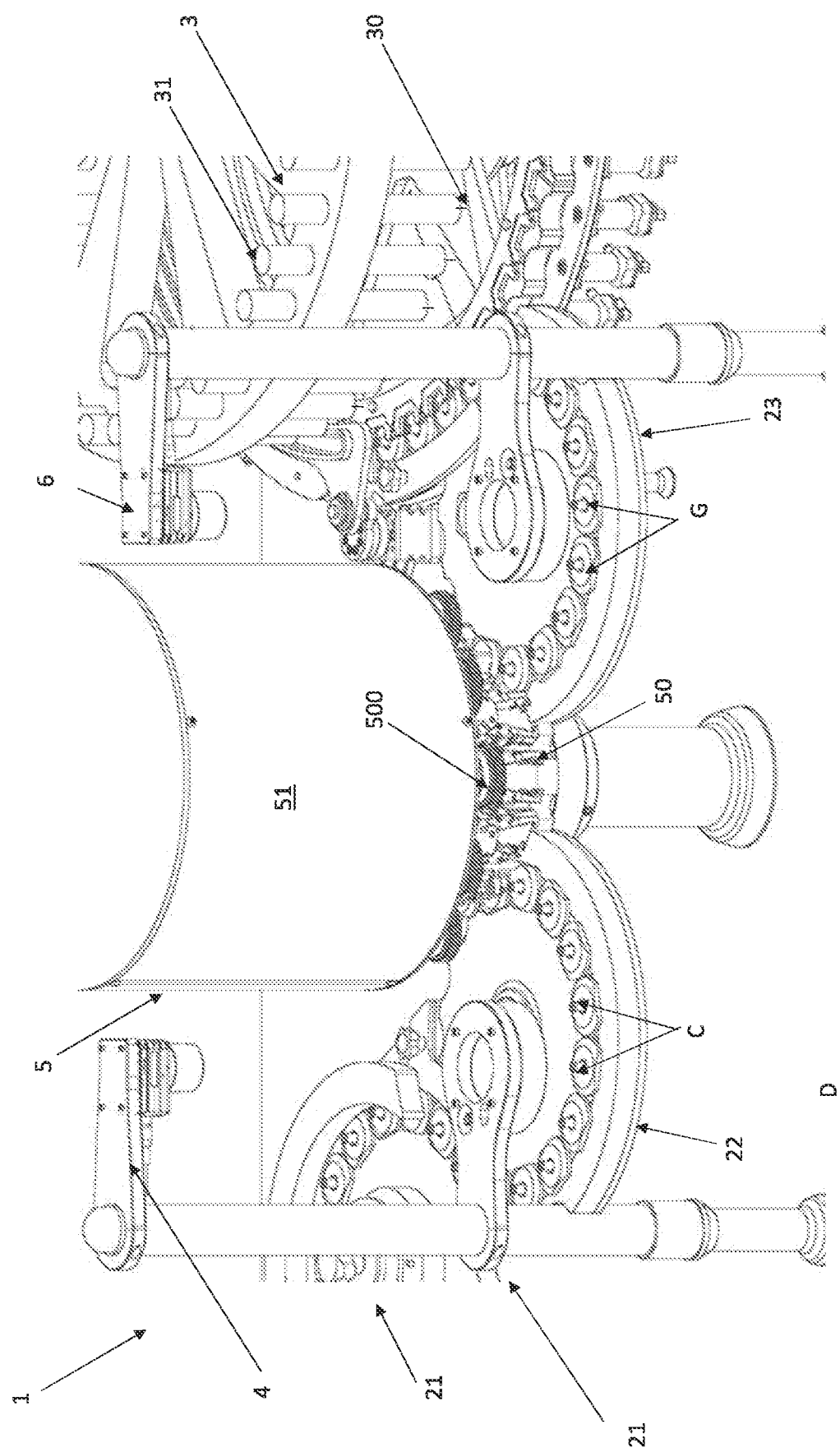
FIG. 3 is a front perspective view of the machine of FIG. 1.

With reference to FIGS. 1-3, designated by the reference number 1 is a machine for filling cartridges for aerosol-generating devices according to the present invention. As already mentioned previously, the above cartridges C may be used in the pharmaceutical sector (for devices that deliver medicaments) or in the tobacco sector (for electronic cigarettes).

A cartridge C (illustrated in two schematic perspective views in FIGS. 4A and 4B, according to two different examples, and in two enlarged top plan views in FIGS. 5A and 5B, according to two different examples) has an axis H of longitudinal development and a container body B defined by side walls L and by a bottom wall F. Present on the side opposite to the bottom wall F is an end E with an open area A where access into the cartridge C is allowed, and an at least partially occluded area O where access to the inside of the cartridge C is prevented. The axis H of longitudinal development passes through the aforesaid end E and through the bottom wall F.

Figure 4A:
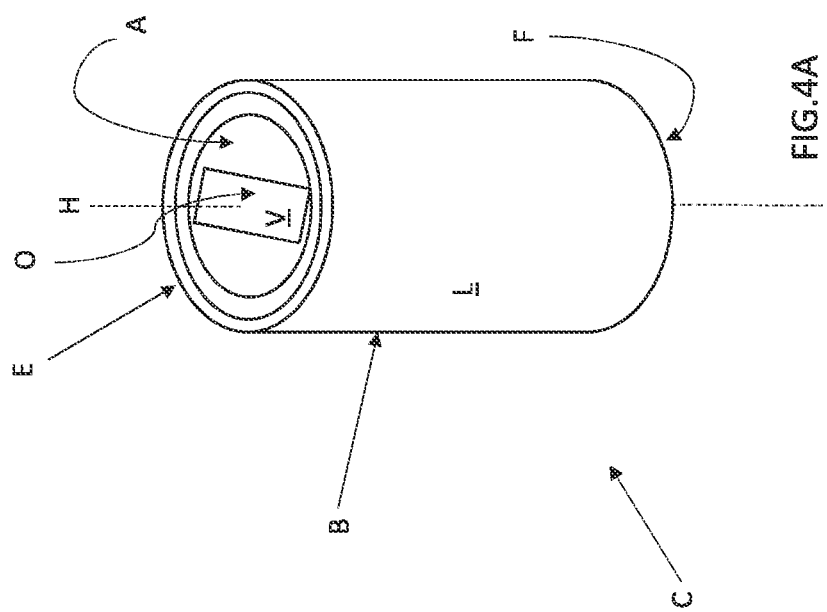
Figure 5B:
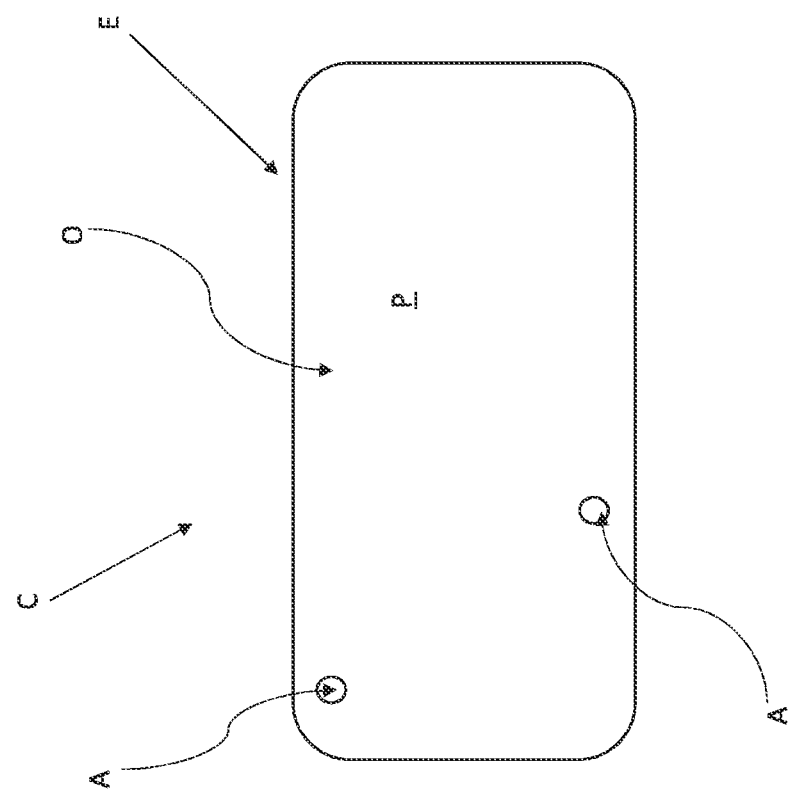
FIG. 5A and FIG. 5B are two enlarged top plan views of two cartridges for aerosol-generating devices of a different type.
Figure 5A:
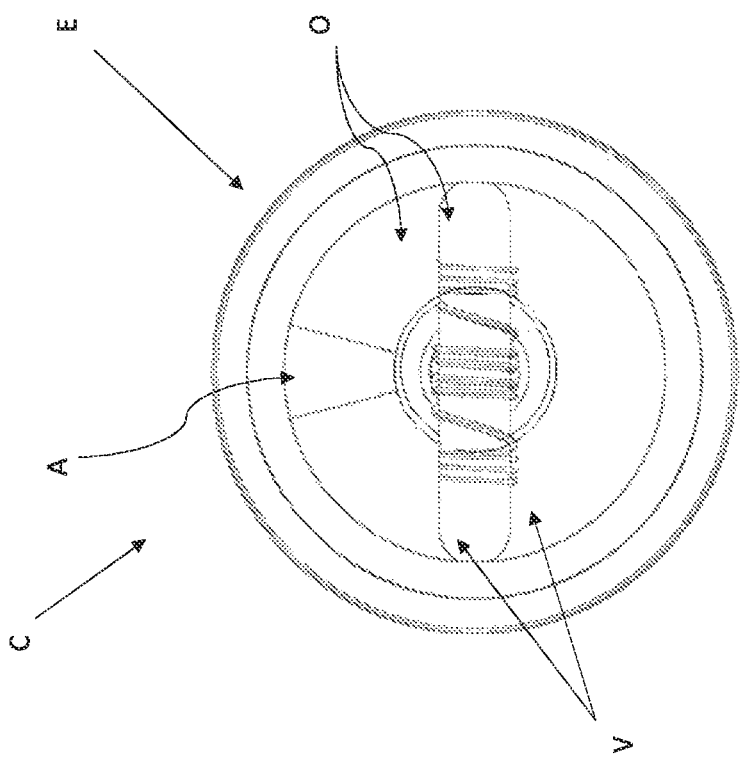

In particular, by "open area A of the end E" is meant an area of the cartridge C accessible for the purposes of filling, whereas by "at least partially occluded area O" is meant an area where access to the inside of the cartridge C for the purposes of filling is prevented or hindered. In detail, as already anticipated in the introductory part of the present treatment, the at least partially occluded area O may be determined, for example, by the presence of some components V pre-arranged within the cartridge C (for example, as has already been said, an absorbent substrate, a channel for passage of air, a wick with a resistance, etc.). Reference may be made to FIG. 5A, where visible from above is a cartridge C of this type (in particular, a cartridge C for an electronic cigarette), and to FIG. 4A, where a schematic perspective view of another cartridge C of this type is represented.

Figure 4B:
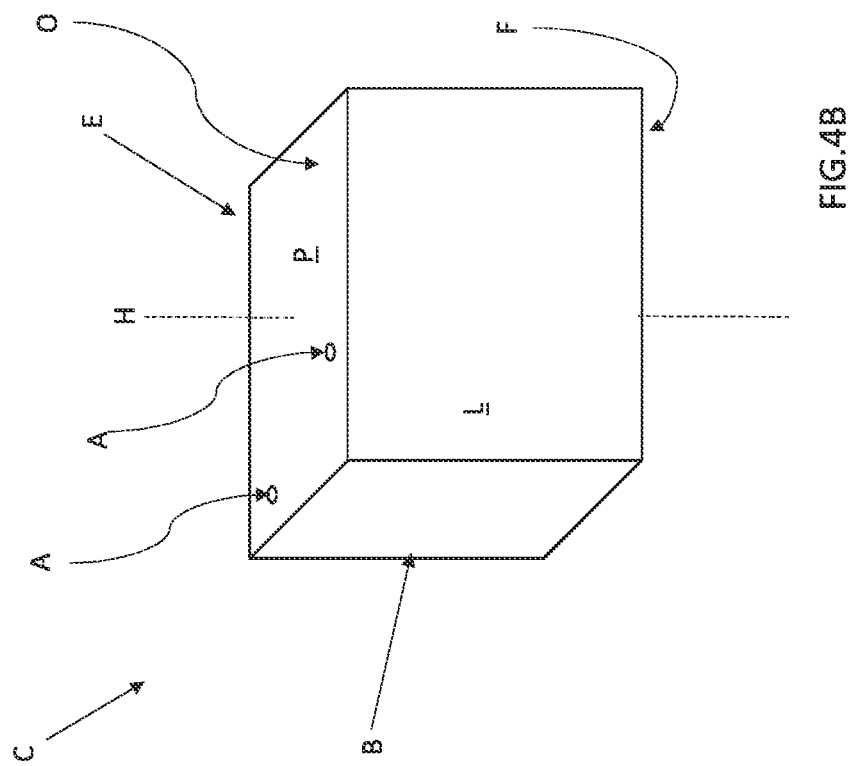
FIG. 4A and FIG. 4B are two schematic perspective views of two cartridges for aerosol-generating devices of a different type.

According to a further example, illustrated schematically in FIG. 4B, the at least partially occluded area O may be defined by a wall P of the cartridge C, located at the aforesaid end E, opposite to the bottom wall F. In other words, in this case, the opening of the cartridge C may be set asymmetrically with respect to the longitudinal axis H of the cartridge C itself, and/or may have an irregular profile, or else again one or more open areas A of small dimensions may be present. With reference to FIG. 5B, represented, in top plan view, is a cartridge C with a substantially rectangular cross section with two open areas A of small dimensions set asymmetrically with respect to the longitudinal axis H of the cartridge C.

With reference to the attached FIGS. 1-3, the filling machine 1 according to the invention comprises: a feed line 2, which supplies cartridges C to be filled with their corresponding ends E facing upwards (in particular, with a vertical orientation) in a direction of feed D; and a filling station 3, which receives the cartridges C to be filled that have been supplied and comprises at least one dispensing nozzle 30, which is mobile along a path of forward stroke and is pre-arranged for dispensing a (liquid or powder) product into the cartridge C.

In particular, the machine 1 comprises first inspection means 4, configured for inspecting the ends E of the cartridges C to be filled in order to identify (or else make it possible to identify), for each cartridge C, the position of the corresponding open area A. With reference to the attached FIGS. 1-3, the first inspection means 4 are arranged above the feed line 2 (i.e., above the cartridges C).

The machine 1 further comprises an orientation station 5, which receives the cartridges C to be filled that have been inspected and comprises orientation means 50, configured for rotating each cartridge C about its own longitudinal axis H on the basis of the corresponding position identified by the first inspection means 4. The orientation means 50, in detail, are pre-arranged for bringing the open area A of each cartridge C into a position corresponding to a pre-set reference position, for enabling entry of the dispensing nozzle 30 into the open area A of the cartridge C when the dispensing nozzle 30 is driven along the path of forward stroke (and the cartridge C is located in the filling station 3). The orientation means 50 comprise, for example, gripping means 500, described in greater detail in what follows.

In other words, on the basis of the orientation with which the cartridges C are set when they are inspected, i.e., on the basis of the orientation with which the cartridges C are supplied, the orientation means 50 orient each cartridge C, rotating it about its own longitudinal axis H in such a way that, when the cartridge C is in the filling station 3, the corresponding open area A is aligned to the dispensing nozzle 30, for enabling the latter to enter the cartridge C and fill it with a product. Consequently, whatever the orientation of the cartridges C with respect to the corresponding longitudinal axis H, and whatever the conformation and arrangement of the corresponding open area A, with the present invention, filling of the cartridges C is guaranteed.

The pre-set reference position is the position (for example, with respect to the longitudinal axis H of the cartridge C) in which the open area A of each cartridge C must be arranged for the dispensing nozzle 30 to be able to enter the cartridge C when the latter is in the filling station 3 (i.e., the position axially aligned to the dispensing nozzle 30 when the dispensing nozzle 30 performs the corresponding forward stroke).

With reference to the attached FIGS. 1-3, the orientation station 5 is set upstream of the filling station 3 (with respect, for example, to a path of the cartridges C in the direction of feed D).

With reference to the attached FIGS. 1-3, the first inspection means 4 are located upstream of the filling station 3 (with respect, for example, to a path of the cartridges C in the direction of feed D).

Preferably, but not exclusively, the first inspection means 4 comprise optical means (for example, a camera).

The dispensing nozzle 30 may be constituted by a needle.

During the corresponding forward stroke, the dispensing nozzle 30 can be moved vertically from above downwards, and then perform a return stroke, in a direction opposite to the forward stroke. Dispensing of the product may occur at the end of the forward stroke of the dispensing nozzle 30, but also immediately after (during the first stretch of the return stroke) and/or immediately before (during the last stretch of the forward stroke).

Preferably, the filling station 3 comprises a plurality of dispensing nozzles 30, as in the case illustrated.

For instance, the feed line 2 comprises at least one transfer device 21, 22, 23, for example a rotary star conveyor or a linear conveyor.

The filling machine 1 may comprise a control unit (not illustrated), which is connected to the first inspection means 4 and to the orientation station 5. The control unit receives the information (for example, one or more images) from the first inspection means 4 and processes it for identifying the position of the open area A of each cartridge C (i.e., the orientation of the cartridge C with respect to the corresponding longitudinal axis H).

The control unit may comprise a memory, stored in which is the aforesaid reference position of the open area A of each cartridge C, i.e., as has already been said, the position in which the open area A of each cartridge C must be set for the dispensing nozzle 30 to be able to enter the cartridge C when the cartridge C is located in the filling station 3.

The control unit is able to compare the position detected by the first inspection means 4 with the reference position stored in the memory, and, if these two positions do not coincide, drives the orientation means 50 so that they will turn the cartridge C in order to bring the corresponding open area A into the reference position.

According to the preferred embodiment illustrated in the attached FIGS. 1-3, the filling machine 1 further comprises: second inspection means 6, configured for inspecting the ends E of the cartridges C to be filled at output from the orientation station 5 in order to identify (or else make it possible to identify), for each cartridge C, the position of the corresponding open area A. With reference to the aforesaid figures, the second inspection means 6 are located downstream of the orientation means 50 (i.e., downstream of the orientation station 5 and upstream of the filling station 3 with respect to a path of the cartridges C in the direction of feed D) and above the cartridges C (i.e., above the feed line 2).

Preferably, but not exclusively, the second inspection means 6 comprise optical means (for example, a camera).

The filling machine 1 may further comprise control means (not illustrated), which, on the basis of the identified position of each cartridge C, drive or inhibit movement of the dispensing nozzle 30 along the path of forward stroke and consequent dispensing of the product.

In other words, a second inspection of the orientation of the cartridges C with respect to the corresponding longitudinal axis H is carried out. Thanks to the control means, movement of the dispensing nozzle 30 in the corresponding path of forward stroke can be prevented in the case where a cartridge C is not properly oriented for the purposes of filling thereof. In this way, advantageously, there is prevented both impact of the dispensing nozzle 30 on the occluded area O of the end E of the cartridge C, and waste of liquid, which would be dispensed without obtaining filling of the cartridge C and would, instead, dirty the filling station 3 and the surrounding environment.

The filling machine 1 may comprise a control unit (not illustrated), which may be the one referred to previously or not and is connected to the second inspection means 6 and to the filling station 3. The control unit receives the information (for example, one or more images) from the second inspection means 6 and processes it in order to identify the position of the open area A of each cartridge C.

The control unit may comprise a memory (which may be the one referred to previously or not), stored in which is the aforesaid reference position of the open area A of each cartridge C, as described previously, i.e., the position in which the open area A of each cartridge C must be set for the dispensing nozzle 30 to be able to enter the cartridge C when the latter is in the filling station 3.

The control unit compares the position detected by the second inspection means 6 with the reference position stored in the memory, and, if these positions do not coincide, drives the dispensing nozzle 30 which is to fill that cartridge C so that it will not perform the corresponding forward stroke (i.e., it inhibits the corresponding movement) and will not deliver the product. Otherwise, i.e., if the detected position and the reference position coincide, the control unit drives the movement of the dispensing nozzle 30; i.e., it enables movement thereof along the corresponding path of forward stroke and dispensing of the product into the cartridge C.

With reference in the attached FIGS. 1-3, the second inspection means 6 are located upstream of the filling station 3.

Preferably, with reference to FIGS. 1-3, the filling station 3 comprises a plurality of dispensing nozzles 30 and a plurality of heads 31, each head 31 carrying at least one dispensing nozzle 30 for moving it during the corresponding forward stroke.

The filling station 3 may further comprise release means (not visible in the attached figures), connected to each dispensing nozzle 30 and to the corresponding head 31. The release means can be activated for automatically releasing each dispensing nozzle 30 from the respective head 31 following upon contact of the dispensing nozzle 30 with the occluded area O of the cartridge C during movement thereof along the path of forward stroke in order to interrupt the forward stroke (and also prevent dispensing of the product).

Advantageously, in this way, impact of the dispensing nozzle 30 against the occluded area O of the end E of the cartridge C is limited; such impact could cause significant damage to the dispensing nozzle 30 if the latter were, instead, to continue along its path of forward stroke. In addition, useless dispensing of product is prevented, which would constitute a waste and would moreover dirty the filling station 3.

For instance, the release means comprise elastic means and/or pneumatic means.

Clearly, the release means may be present together with, or as an alternative to, the control means described previously. In the case where the release means are provided together with the control means described previously, advantageously, they constitute a further solution aimed at preventing in an even more certain way damage to the dispensing nozzle 30 and undesirable dispensing of the product. In fact, in the case where, even in the presence of second inspection means 6, a dispensing nozzle 30 were to be driven along its path of forward stroke, but the cartridge C were not to have the corresponding open area A set in the reference position (hence in the case either of erroneous driving of the dispensing nozzle 30 or of erroneous inspection of the end E of a cartridge C), damage to the dispensing nozzle 30 and undesirable dispensing of product would in any case be prevented for the reasons described above.

There now follows a detailed description of the path of the cartridges C with reference to the embodiment illustrated.

With reference to the attached FIGS. 1-3, the cartridges C are conveyed along the entire machine 1 within supporting containers G, also referred to as godets, which are designed for carrying unstable products and/or products of small dimensions. It is clear that the cartridges C, according to a variant not illustrated, can be conveyed, with suitable means, along the entire machine 1 even in the absence of the aforesaid supporting containers G.

Once again with particular reference to what has been illustrated, the feed line 2 comprises three rotary or star conveyors 21, 22, 23, two of which 21, 22 being arranged consecutive to one another, upstream of the orientation station 5, and one 23 being set between the orientation station 5 and the filling station 3. It is clear that, as has already been said, the number and type of transfer conveyors may be different. Hence, in the case illustrated, the orientation station 5 is arranged along the feed line 2.

To return to FIGS. 1-3, the star conveyors 21, 22, 23 are mobile in rotation about a respective vertical central axis and have peripheral seats within which they receive and convey the supporting containers G housing the cartridges C (for example, thanks to the presence of withholding means such as suction cups and/or negative-pressure means, not illustrated).

The cartridges C thus travel along the first star conveyor 21 and are then transferred to the second star conveyor 22, arranged above which the first inspection means 4, in this case comprising a camera 4. Here the cartridges C are inspected as described above. The information detected by the camera 4 is sent to the control unit (not illustrated), which processes it to identify the position of the open area A of each cartridge C and drive the orientation means 50 accordingly.

The orientation means 50 are arranged in the orientation station 5, which comprises, for example, a rotary turret 51. The orientation means 50 comprise gripping means 500 such as grippers or picker hands (see the detail of FIG. 2), which are carried by the turret 51 and, when the cartridges C are in the orientation station 5, are set above the cartridges C. If the detected position of a cartridge C is different from the reference position, the gripping means 500 pick up the cartridge C, and turn it about the corresponding longitudinal axis H, as described previously, to bring the position identified into the reference position. If the two positions already coincide before the cartridges C reach the orientation station 5, the gripping means 500 will not perform any action.

In the orientation station 5, underneath the gripping means 500, a wheel with vertical axis is provided, which conveys the cartridges C, and is in particular provided with housings for receiving and withholding the cartridges C and the corresponding supporting container G.

At output from the orientation station 5, the cartridges C in the corresponding supporting containers G reach the third star conveyor 23, provided on which are the second inspection means 6, which in this case comprise a camera 6. The third conveyor 23 advantageously makes it possible to have time and space between the orientation station 5 and the filling station 3 to carry out a second inspection of the cartridges C.

Once inspected, the cartridges C enter the filling station 3. In the case illustrated, the filling station 3 is a carousel mobile in rotation about the corresponding vertical central axis, which comprises a plurality of heads 31, each of which carries a dispensing nozzle 30 (in detail, a needle) and which are arranged so to define a closed circular path. In this case, filling of the cartridges C occurs while the cartridges C are moving. Clearly, the filling station 3 may even be of a type different from the one illustrated: for example, the filling station may be of the linear or rotary type, or else may envisage filling of the cartridges while they are in the stationary condition.

Underneath the dispensing nozzles 30, the filling station 3 comprises a wheel with vertical axis, which, by rotating, causes advance of the cartridges C; in detail, the wheel is provided with housings for receiving and withholding the cartridges C and the corresponding supporting container G.

As described previously, the cartridges C may be filled or not, according to whether they are properly oriented or not.

After passage through the filling station 3, the cartridges C in the corresponding supporting container G are conveyed towards an output, via the conveying means, not represented in the attached drawings.

The invention moreover regards a method for filling cartridges C for aerosol-generating devices, wherein each cartridge C comprises an end E with an open area A which enables access to the inside of the cartridge C and an occluded area O where access to the inside of the cartridge C is prevented. The cartridge C has an axis H of longitudinal development that passes through the aforesaid end E (for further details on the cartridge C, see the foregoing description).

The filling method according to the invention may be implemented, preferably, but not exclusively, by the filling machine 1 described above.

The method according to the invention comprises the step of feeding the cartridges C to be filled with their corresponding ends E facing upwards (preferably with a vertical orientation).

In particular, following upon the aforesaid step, the method comprises the steps of:
   carrying out a first inspection of the ends E of the cartridges C to be filled in order to identify the position of the corresponding open area A; and then:
   orienting each cartridge C to be filled, rotating it about its own longitudinal axis H on the basis of the identified position, to bring the open area A into a reference position; and
   filling each cartridge C with a product if the corresponding open area A is in the reference position.

The method according to the invention guarantees filling of the cartridges C whatever the orientation of the cartridges C (with respect to the corresponding longitudinal axis H) during feed thereof (i.e., at the moment of their inspection). Moreover, the method makes it possible to fill any type of cartridge C, as already described previously, whatever the conformation, size, and arrangement of the corresponding open area A with respect to the aforesaid longitudinal axis H and with respect to the end E of the cartridge C (i.e., also in the case of components provided in the cartridge C or of walls that constitute an impediment to access to the inside of the cartridge C).

Clearly, if the open area A of a cartridge C is already in the pre-set reference position, the cartridge C is not turned about its own longitudinal axis H.

For instance, the method according to the invention may further comprise the steps of storing in a memory a reference position of the open area A of each cartridge C, i.e., the position in which the open area A of each cartridge C is to be arranged for the filling operation to be successful.

For instance, the step of orienting each cartridge C to be filled comprises the sub-steps of:
   comparing the effective position of the open area A of each cartridge C that has been detected with the reference position stored in the memory; and, if these do not coincide,
   rotating the cartridge C to bring the corresponding open area A into the reference position.

Preferably, the method may comprise, following upon the step of orienting each cartridge C to be filled and prior to the filling step, the step of:
   carrying out a second inspection of the ends E of the cartridges C to be filled that have been oriented in order to identify the position of the corresponding open area A.

In this case, a double check of the ends E of the cartridges C to be filled is carried out.

Preferably, the step of filling each cartridge C comprises the step of:
   providing (at least) a dispensing nozzle 30, which is mobile along a path of forward stroke and is able to dispense a (liquid or powder) product, following upon movement thereof.

The dispensing nozzle 30 may be constituted by a needle, as described above.

Furthermore, following upon the step of providing the dispensing nozzle 30, the method may comprise the step of:
   driving the dispensing nozzle 30 along the corresponding path of forward stroke (for example, in a vertical direction, as described previously).

As an alternative to what has just been said, following upon the step of providing a dispensing nozzle 30, the method may comprise the step of:

inhibiting movement of the dispensing nozzle 30 along the corresponding path of forward stroke and dispensing of the product if the open area A of the cartridge C is not in the reference position.

In this way, advantageously, as has already been said previously, impact of the dispensing nozzle 30 against the occluded area O of the end E of the cartridge C, which could cause significant damage to the dispensing nozzle 30, is prevented. In addition, useless dispensing of product, which would otherwise constitute a waste and moreover would dirty the surrounding environment, is prevented.

As an alternative to what has been said, the method may comprise, following upon the step of driving the dispensing nozzle 30, the step of:

interrupting the forward stroke of the dispensing nozzle 30 if the dispensing nozzle 30 comes into contact with the at least partially occluded area O of the cartridge C during the forward stroke and inhibiting dispensing of the product.

The above step may be carried out, for example, if the second inspection is not successful and the dispensing nozzle 30 has been driven along its path of forward stroke even if the position of the open area A of a cartridge C does not coincide with the pre-set reference position.

In this way, advantageously, as has already been said previously, any impact of the dispensing nozzle 30 against the occluded area O of the end E of the cartridge C is limited; such impact could cause significant damage to the dispensing nozzle 30 if the latter were, instead, to continue along its corresponding path of forward stroke. In addition, useless dispensing of product is prevented, which would otherwise constitute a waste and would moreover soil the surrounding environment.

The invention claimed is:

1. A machine for filling cartridges for aerosol-generating devices, each cartridge including an end with an open area where access to an inside of the cartridge is allowed and an at least partially occluded area where access to the inside of the cartridge is prevented, the cartridge having an axis of longitudinal development that passes through said end, the machine comprising:

a feed line, which supplies cartridges to be filled with their corresponding ends facing upwards;

a filling station, which receives the cartridges to be filled and comprises at least one dispensing nozzle, which is mobile along a path of forward stroke and is pre-arranged for dispensing a product;

first inspection means configured for inspecting the ends of the cartridges to be filled in order to identify, for each one, a position of the corresponding open area; and an orientation station, which receives the cartridges to be filled that have been inspected, the orientation station including orientation means configured for: rotating each cartridge about its own longitudinal axis on a basis of the corresponding identified position of the corresponding open area, and bringing the open area into a position corresponding to a pre-set reference position for enabling entry of the at least one dispensing nozzle into the open area of the cartridge when the at least one dispensing nozzle is driven along the path of forward stroke.

2. The machine according to claim 1, further comprising:
a control unit, which is connected to the first inspection means and to the orientation station and receives information from the first inspection means and processes it in order to identify the open area of each cartridge, the control unit being provided with a memory, in which said pre-set reference position is stored, and being able to compare the identified position with the pre-set reference position, in order to control the orientation means so that the orientation means will turn each cartridge in order to bring the corresponding open area into the pre-set reference position.

3. The machine according to claim 1, further comprising:
second inspection means configured for inspecting the ends (E) of the cartridges (C) to be filled at an output from the orientation station in order to identify, for each one, the position of the corresponding open area; and
control means, which, on a basis of the identified position of the corresponding open area of each cartridge, activate or inhibit movement of the at least one dispensing nozzle along the path of forward stroke and consequent dispensing of the product.

4. The machine according to claim 3, wherein the control means includes a control unit, which is connected to the second inspection means and to the filling station and receives information from the second inspection means and processes it so as to identify the position of the open area of each cartridge, the control unit being provided with a memory, in which said pre-set reference position is stored, and being able to compare the position identified by the second inspection means with the pre-set reference position stored in the memory in order to drive the at least one dispensing nozzle so that it will perform movement along the path of forward stroke or inhibit it from performing said movement along the path of forward stroke.

5. The machine according to claim 1, wherein the at least one dispensing nozzle comprises a plurality of dispensing nozzles and the filling station further comprises a plurality of heads, each head carrying at least one of the dispensing nozzles so as to move the at least one of the dispensing nozzles along the corresponding path of forward stroke; and wherein the filling station further comprises release means, connected to each dispensing nozzle and to the corresponding head, the release means being activatable for releasing each dispensing nozzle from the respective head following contact of each dispensing nozzle with the at least partially occluded area of the cartridge during movement of each dispensing nozzle along the path of forward stroke, in order to interrupt said movement along the path of forward stroke.

6. The machine according to claim 5, wherein the release means comprises elastic means or pneumatic means.

7. A method for filling cartridges for aerosol-generating devices, wherein each cartridge comprises an end with an open area, where access to an inside of the cartridge is allowed, and an at least partially occluded area, where access to the inside of the cartridge is prevented, each cartridge having an axis of longitudinal development that passes through said end, the method comprising, in succession, the steps of:

feeding the cartridges to be filled with their corresponding ends facing upwards;

carrying out a first inspection of the end of each cartridge to be filled in order to identify a position of the corresponding open area;

orienting each cartridge to be filled by rotating it about its own longitudinal axis (H) on a basis of the identified position, so as to bring the corresponding open area into a reference position; and filling each cartridge with a product if the corresponding open area is in the reference position.

8. The method according to claim 7, further comprising, prior to the filling step, the step of:

carrying out a second inspection of the ends of the cartridges to be filled that have been oriented in order to identify the position of the corresponding open area.

9. The method according to claim 7, wherein the step of filling each cartridge comprises the step of:

providing a dispensing nozzle, which is mobile along a path of forward stroke and is able to dispense a product following a corresponding movement along the path of forward stroke.

10. The method according to claim 9, comprising, following the step of providing the dispensing nozzle, the step of:

driving the dispensing nozzle along the corresponding path of forward stroke.

11. The method according to claim 10, further comprising the step of:

interrupting the driving of the dispensing nozzle along the corresponding path of forward stroke if the dispensing nozzle contacts the at least partially occluded area of the cartridge during the forward stroke and inhibiting dispensing of the product.

12. The method according to claim 9, comprising the step of:

inhibiting movement of the dispensing nozzle along the corresponding path of forward stroke and dispensing of the product if the open area of the cartridge is not in the reference position.

* * * * *